United States Patent [19]

Förster

[11] 4,207,493
[45] Jun. 10, 1980

[54] CATHODE RAY TUBE ARC-OVER PROTECTION

[75] Inventor: Gerhard Förster, Würenlos, Switzerland

[73] Assignee: RCA Corporation, New York, N.Y.

[21] Appl. No.: 946,017

[22] Filed: Sep. 26, 1978

[51] Int. Cl.² .................................................. H01J 23/16
[52] U.S. Cl. ................................... 315/3; 313/477 R; 313/479
[58] Field of Search .......................... 328/8; 315/3, 58; 313/477 R, 477 HC, 478, 479, 481, 482; 178/2.3 R

[56] References Cited

U.S. PATENT DOCUMENTS

| | | | |
|---|---|---|---|
| 3,551,821 | 12/1970 | Griffey | 315/3 |
| 3,909,655 | 9/1975 | Grimmett et al. | 313/451 |
| 4,047,225 | 9/1977 | Pittenger | 178/2.3 R |
| 4,101,803 | 7/1978 | Retsky et al. | 315/3 |

OTHER PUBLICATIONS

Kleisma, A. C. "Protection Against Flashover in Color TV" Phillips Application Information Sep. 1967, pp. 3–10.

Primary Examiner—David K. Moore
Attorney, Agent, or Firm—Eugene M. Whitacre; Paul J. Rasmussen; Joseph J. Laks

[57] ABSTRACT

The high voltage terminal of the ultor capacitance of a cathode ray tube is coupled to an electron gun structure. The ultor return terminal which typically comprises an outer conductive coating of the cathode ray tube envelope is coupled to the ground return base pin of the cathode ray tube. The ground termination for electrical components and the chassis is also coupled to the ground return base pin. During arc-over, the cathode ray tube ultor capacitance discharges through the ground return base pin. Arc-over current oscillations flow in the chassis and electrical component circuitry by means of stray capacitive coupling to the ultor return terminal. A resistor is coupled to the chassis and to the ultor return terminal for damping arc-over current oscillation in the chassis and in the component circuitry.

8 Claims, 4 Drawing Figures

CATHODE RAY TUBE ARC-OVER PROTECTION

BACKGROUND OF THE INVENTION

This invention relates to arc-over reduction in cathode ray tubes.

Accelerating potential or ultor voltage for the electron beams within a cathode ray tube is generated by rectification of an alternating current voltage and coupling the rectified voltage to the ultor terminal of the cathode ray tube. The ultor terminal is coupled to an ultor inner conductive coating of the cathode ray tube envelope. The inner coating forms one electrode of an ultor capacitance. An ultor outer conductive coating forms the other electrode which serves as the ultor ground return terminal for ultor current.

The anode electrode of the electron gun is connected to the inner conductive coating, typically by means of spring contacts. The ultor accelerating potential serves as an energizing voltage for the anode electrode. Energizing voltages for the other electrodes, such as the screen, grid, and cathode electrodes, are developed by associated energizing circuitry external to the cathode ray tube. Connecting base pins in the base of the cathode ray tube couple the energizing voltages to the associated electron gun electrodes.

One of the connecting base pins serves as the ground return base pin for ultor current and is connected to the ultor outer conductive coating. Typical termination structure to the outer coating from the ground return base pin may comprise a U-shaped braid of copper wire closely pressed over the outer conductive coating on the cathode ray tube envelope. One or several copper wires connect various points along the copper braid to the ground return base pin. The ground return base pin is also connected to the common ground current return terminal of the energizing circuitry or to a chassis grounding terminal if the energizing circuitry and chassis have mutual ground current returns.

During cathode ray tube arc-over, the ultor voltage across the ultor capacitance may be coupled to several of the connecting base pins, thereby subjecting the energizing circuitry and other circuitry sharing common current return paths to overvoltages from the relatively low impedance ultor capacitance source. Sensitive semiconductor devices may be damaged due to the overvoltages developed and the relatively large arc-over currents flowing in the chassis and energizing circuitry.

Conventional techniques for arc-over protection involve shunting the arc-over current away from the energizing circuitry directly to the ultor ground return terminal through a spark gap coupled to the cathode ray tube connecting base pins. Relatively high impedance resistors may also be coupled between various ones of the base pins and the energizing circuitry to provide a voltage drop across the resistor for limiting arc-over voltages.

Nevertheless, arc-over current oscillation within the energizing circuitry may still develop. Stray capacity between the ultor ground return terminal and the chassis or energizing circuitry may provide a sufficiently low impedance AC current path from the ground return base pin to sustain relatively large and undesirable arc-over current oscillations. Such oscillations should be substantially reduced.

SUMMARY OF THE INVENTION

A cathode ray tube ultor capacitance includes high voltage termination structure and ultor current return structure. An electron gun structure is coupled to the ultor capacitance and to energizing circuitry. A current damping circuit is coupled to a common current return terminal within the energizing circuitry and to the ultor current return structure for damping current oscillations during cathode ray tube arc-over.

DESCRIPTION OF THE INVENTION

Figure 1:
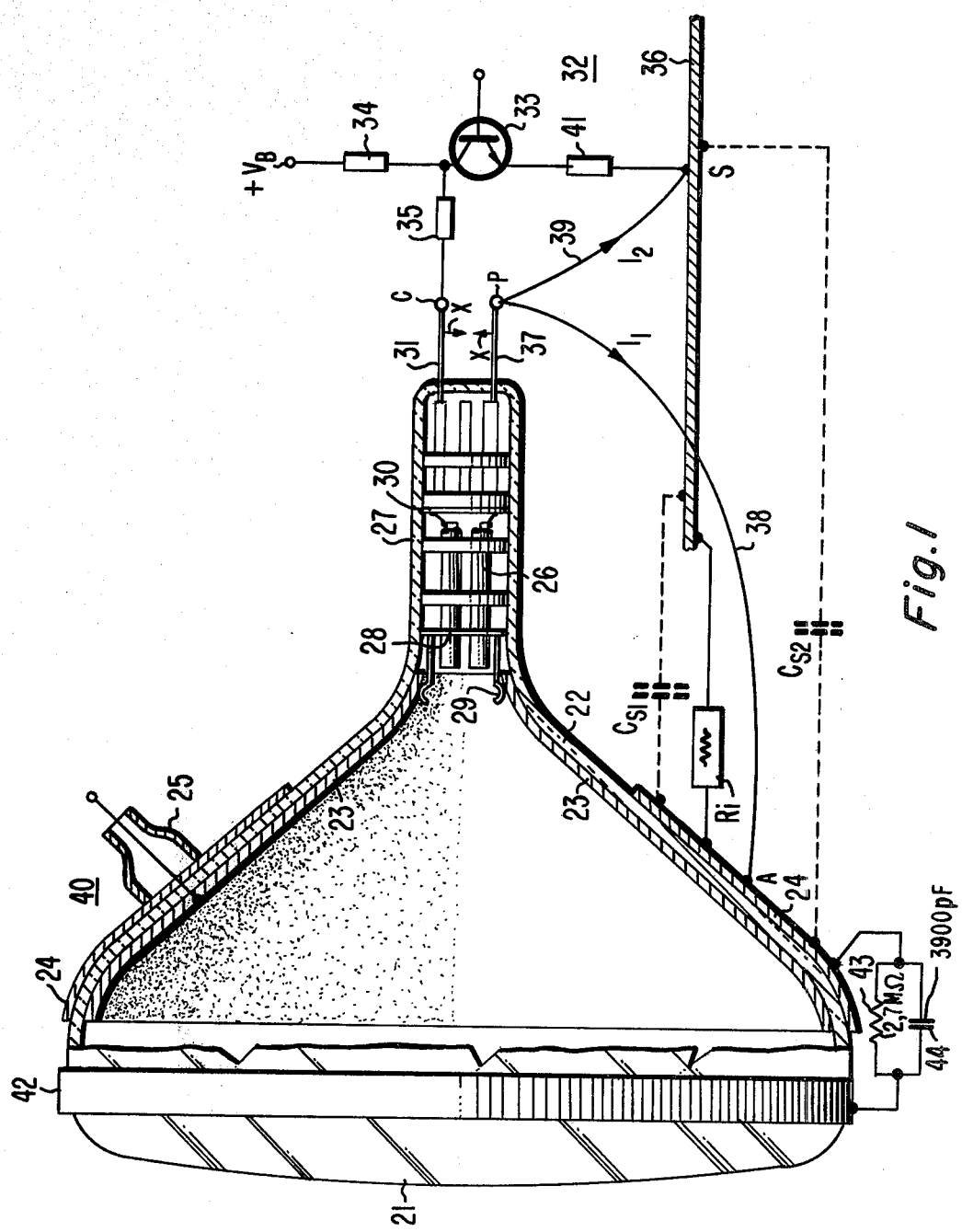
FIG. 1 illustrates in partial schematic a cathode ray tube and associated structure which embodies the invention.

As illustrated in the partially schematic FIG. 1, a cathode ray tube 21, of a television receiver, for example, includes an envelope 22, an inner conductive coating 23 and an outer conductive coating 24. Coatings 23 and 24 form the plates or electrodes of an ultor capacitance 40. During operation of the television receiver, a high voltage accelerating potential is developed across ultor capacitance 40. An alternating current voltage, such as developed by a flyback transformer, not illustrated, is rectified and coupled to inner coating 23 through a conventional ultor high voltage termination structure 25.

A metal rimband 42 is placed about cathode ray tube 41 to reduce implosion hazards. A parallel arrangement of a resistor 43 and a capacitor 44, tuned to the AC line mains supply frequency of 50 Hz or 60 Hz, for example, is coupled between the rimband and the outer conductive coating 24. This parallel arrangement provides AC line electrical shock hazard protection.

A conventional electron gun structure 26 is located interior of the neck portion 27 of cathode ray tube envelope 22. A spring contact 29 connects inner coating 23 to an anode electrode 28 of electron gun 26. The ultor high voltage provides the energizing voltage for the anode electrode 28.

Energizing voltages for the other electrodes of electron gun 26, such as the focus and screen electrodes, are coupled through other base pins from energizing circuitry associated with the cathode ray tube and other television receiver components. As illustrated in FIG. 1, energizing voltage for the cathode electrode 30, for example, is coupled through a cathode base pin 31 from a video output energizing circuit 32, only partly illustrated.

Video output circuit 32 includes a driver transistor 33 coupled to a DC voltage source $+V_B$ through a resistor 34. Video input signals are coupled to the base of transistor 33 from conventional video processing circuitry not illustrated. Cathode drive signals at the collector of transistor 33 are coupled to cathode base pin 31 through a resistor 35. The termination from energizing circuit 32 to base pin 31 may be conventional and is indicated generally by a solder terminal C.

The emitter of transistor 33 is coupled to a common ground current return terminal S of energizing circuitry 32 through a resistor 41. Such common return terminal S may be located on a frame or chassis 36 or on a separate printed circuit board, with the printed circuit board and chassis sharing mutual ground return paths.

Other electrode base pins, not illustrated, may be electrically interconnected with their respective energizing circuits in a manner similar to that described for the cathode base pin 31.

The outer conductive coating 24 serves as the ultor current return terminal. The current return terminal for the electron gun 26 includes a ground base pin 37. Electrical connection is provided from ground base pin 37 to the ultor outer conductive coating 24 and to either the chassis 36 ground as illustrated in FIG. 1 or to the common current return terminals of the energizing circuitry for electron gun 26, not illustrated. Typically, conductor lengths 38 and 39 are connected respectively between base pin 37 and outer coating 24, and between base pin 37 and chassis ground. The termination structures for the conductor lengths 38 and 39 to base pin 37, outer conductive coating 24, and chassis 36 ground may be conventional and are indicated generally in FIG. 1 by respective solder terminals P, A, and common return terminal S.

Conductor length 38 forms a first direct current path from ground base pin 37 to the ultor current return terminal of outer coating 24. Conductor length 39 forms a second direct current path from ground base pin 37 to the chassis or energizing circuitry common current return terminal S.

An AC current path for cathode ray tube arc-over currents between chassis 36 and the ultor current return terminal of outer coating 24 is formed by means of the stray capacitance between chassis 36 and outer coating 24, as illustrated in FIG. 1 by capacitors $C_{S1}$ and $C_{S2}$ representing stray capacitance between various chassis points and outer coating 24. Although only $C_{S1}$ and $C_{S2}$ are illustrated, the stray capacitance of the chassis is distributed over the entire structure of chassis 36 and may be represented by a capacitor $C_S$ of a circuit 41, schematically illustrated in FIG. 2.

Circuit 41 represents an electrical schematic circuit of arc-over current paths of the ultor capacitance 40 discharge current during arc-over. For example, the ultor voltage at the anode electrode 28 of electron gun 26 may, under fault conditions during arc-over, be coupled to various ones of the other electrodes such as the focus electrode. This ultor voltage is then transmitted to the associated base pins causing arc-over between many of these pins.

Figure 2:
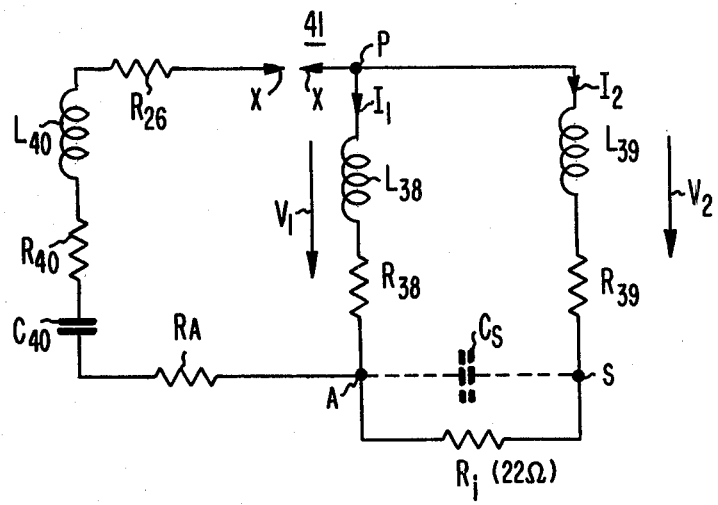
FIG. 2 illustrates an electrical schematic equivalent circuit associated with the structure of FIG. 1.

As illustrated by the arrows X—X in FIG. 1, arc-over may occur between cathode base pin 31 and ground return base pin 37. Much of the ultor voltage will be coupled to terminals P and C. A first arc-over current $I_1$ will flow in conductor 38 to provide the discharge path for ultor return current. As illustrated in FIG. 2, a voltage $V_1$ is developed from terminal P to terminal A, the outer coating 24 termination structure terminal. This voltage will be developed across the series impedance of an inductor $L_{38}$ and resistor $R_{38}$ representing respectively the inductance and resistance of conductor 38. $R_A$ represents the resistance of the outer conductive coating 24 termination structure, $C_{40}$, $R_{40}$, and $L_{40}$ represent respectively the ultor capacity, resistance, and distributed inductance. $R_{26}$ represents the resistance of the termination structure between electron gun 26 and the inner coating 23.

Neglecting for the moment the effect of a resistor $R_i$ coupled between terminal A and chassis terminal S, the voltage $V_1$ acts as a driving potential during arc-over for generating a second oscillatory arc-over current $I_2$ flowing in conductor 39, chassis 36, and the ground current return paths of the electron gun electrode energizing circuitry. As illustrated in FIG. 2, an underdamped oscillatory current $I_2$ is coupled to ultor ground return terminal A by means of the stray capacitance $C_S$. A voltage $V_2$ from terminal P to terminal S is produced by current $I_2$ across the series impedance of an inductor $L_{39}$ and resistor $R_{39}$, representing respectively the inductance and resistance of conductor 39.

Figure 3:
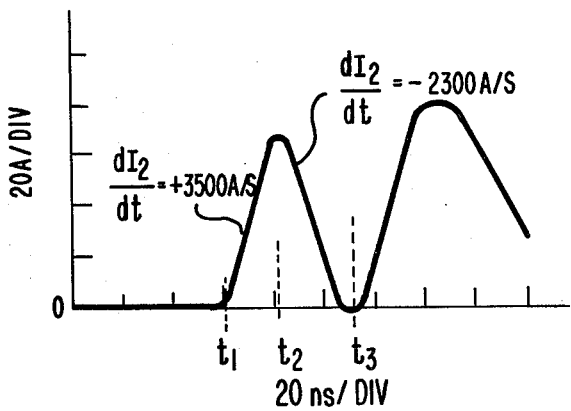
FIGS. 3 and 4 illustrate arc-over current waveforms associated with the structure of FIG. 1 and with the electrical schematic of FIG. 2.

As illustrated in FIG. 3, during typical arc-over situations, the underdamped oscillatory current $I_2$, upon electrode arc-over, begins near time $t_1$ and continues to oscillate for several cycles, reaching a first maximum near time $t_2$ and a first minimum near time $t_3$.

With oscillatory current $I_2$ as illustrated in FIG. 3, the voltage $V_2$ will assume relatively large values of both positive and negative magnitudes. The positive peak magnitude will be produced by the resistive voltage drop $I_2$ developed across $R_{39}$ and also by the positive inductive voltage drop developed across $L_{39}$ caused by the relatively large $+dI_2/dt$ current change during the interval $t_1$–$t_2$, for example, as illustrated in FIG. 3. A relatively large negative peak magnitude for voltage $V_2$ will also be produced by the negative inductive voltage drop developed across $L_{39}$ caused by the relatively large $-dI_2/dt$ current change during the interval $t_2$–$t_3$, for example.

The voltage $V_2$ will be coupled by means of the various base pins, such as cathode base pin 31, to the various energizing circuitry, such as cathode drive circuitry 32, producing harmful voltage stresses within the circuitry and possibly damaging the semiconductor components. Oscillatory currents similar to that of current $I_2$ may also flow in other circuits having mutual or common ground current return paths with chassis 36. Voltages with relatively large positive and negative magnitudes similar to those of voltage $V_2$ may be developed in these other circuits. Sensitive semiconductor devices such as integrated circuits may be damaged as they are especially unable to withstand substantial voltages of polarity opposite to that normally imposed.

A feature of the invention is to damp the oscillatory arc-over current $I_2$ capacitively coupled to the ultor current return terminal A. A resistor $R_i$ is coupled between chassis 36 and the outer conductive coating 24 thereby paralleling the stray capacitance $C_S$, as illustrated schematically in FIG. 2. The resistance value of resistor $R_i$ is selected such that resistor $R_i$ functions to integrate the voltage across stray capacitance $C_S$ at the frequencies of the arc-over currents and substantially damp the oscillatory current $I_2$. Resistor $R_i$ may typically comprise a carbon, carbon composition, or metal film construction. The exact termination locations of resistor $R_i$ on both the outer conductive coating termination structure and on the chassis 36 may vary widely from receiver to receiver.

Figure 4:
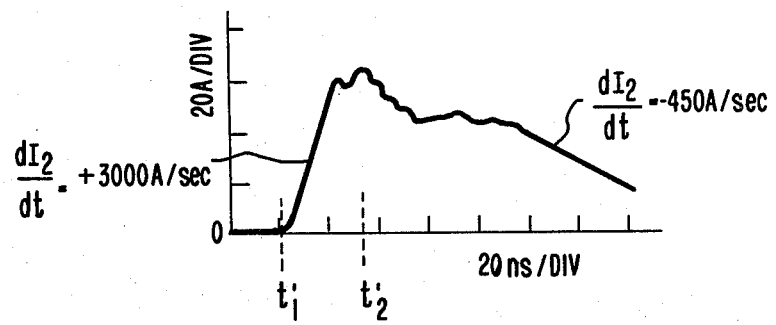

As illustrated in FIG. 4, with resistor $R_i$ coupled across capacitance $C_S$, current $I_2$ is damped, with smaller magnitudes for both $+dI_2/dt$, between times $t_{1'}$–$t_{2'}$ and $-dI_2/dt$ after time $t_{2'}$. The underdamping of current $I_2$ is substantially eliminated and both positive and negative magnitude voltage stresses are substantially reduced.

Typical values for selected discrete and distributed components are approximately as follows:

Resistor $R_A$: 5 to 50 ohms

Resistor $R_f$: 22 to 100 ohms (depending on receiver design)
Resistor $R_{40}$: 20 ohm, soft flash: 200 ohm
Resistor $R_{38}$: less than 1 ohm
Resistor $R_{39}$: less than 1 ohm
Resistor $R_{43}$: 2.7 megohm
Capacitor $C_5$: 30 to 300 pF
Capacitor $C_{40}$: 700 to 3000 pF
Capacitor $C_{44}$: 3900 pF
Inductor $L_{38}$, $L_{39}$: 10 nH/cm

What is claimed is:

1. A system for reduced arc-over for a cathode ray tube, comprising:
   a cathode ray tube;
   a cathode ray tube ultor capacitance with high voltage termination means and with ultor current return termination means;
   an electron gun structure coupled to said ultor capacitance;
   energizing circuitry coupled to said electron gun structure; and
   current damping means connected between said ultor current return termination means and a common current return terminal within said energizing circuitry for damping current oscillations within said electrical circuitry during cathode ray tube arc-over.

2. A circuit according to claim 1 wherein said ultor current return termination means and said common current return terminal are coupled to a ground base pin of said cathode ray tube.

3. A system according to claim 2 wherein said common current return terminal comprises a cathode ray tube chassis.

4. A system according to claim 1 or 3 wherein said damping means prevents said current oscillations from occurring in a substantially underdamped manner.

5. A system according to claim 4 wherein said damping means comprises a resistance coupled between said chassis and said ultor current return termination means.

6. Reduced arc-over apparatus, comprising:
   a cathode ray tube;
   an ultor capacitance, a first electrode of said ultor capacitance comprising an inner conductive coating on said cathode ray tube, a second electrode of said ultor capacitance comprising an outer conductive coating on said cathode ray tube;
   electron gun structure coupled to said inner conductive coating and to a common current return base terminal;
   a cathode ray tube chassis AC coupled by a chassis capacitance to said outer conductive coating;
   conductive means coupling said common current return base terminal to said chassis and to said outer conductive coating;
   electrical circuitry coupled to said chassis; and
   integrating means coupled to said chassis and to said outer conductive coating for integrating the voltage developed across said chassis capacitance during cathode ray tube arc-over for substantially reducing arc-over voltage stress on electrical components within said electrical circuitry.

7. Apparatus according to claim 6 wherein said integrating means substantially eliminates underdamped arc-over current oscillations.

8. Apparatus according to claim 7 wherein said integrating means comprises a resistance.

* * * * *